No. 753,351. PATENTED MAR. 1, 1904.
G. C. BEIDLER.
CAMERA.
APPLICATION FILED NOV. 17, 1903.
NO MODEL.
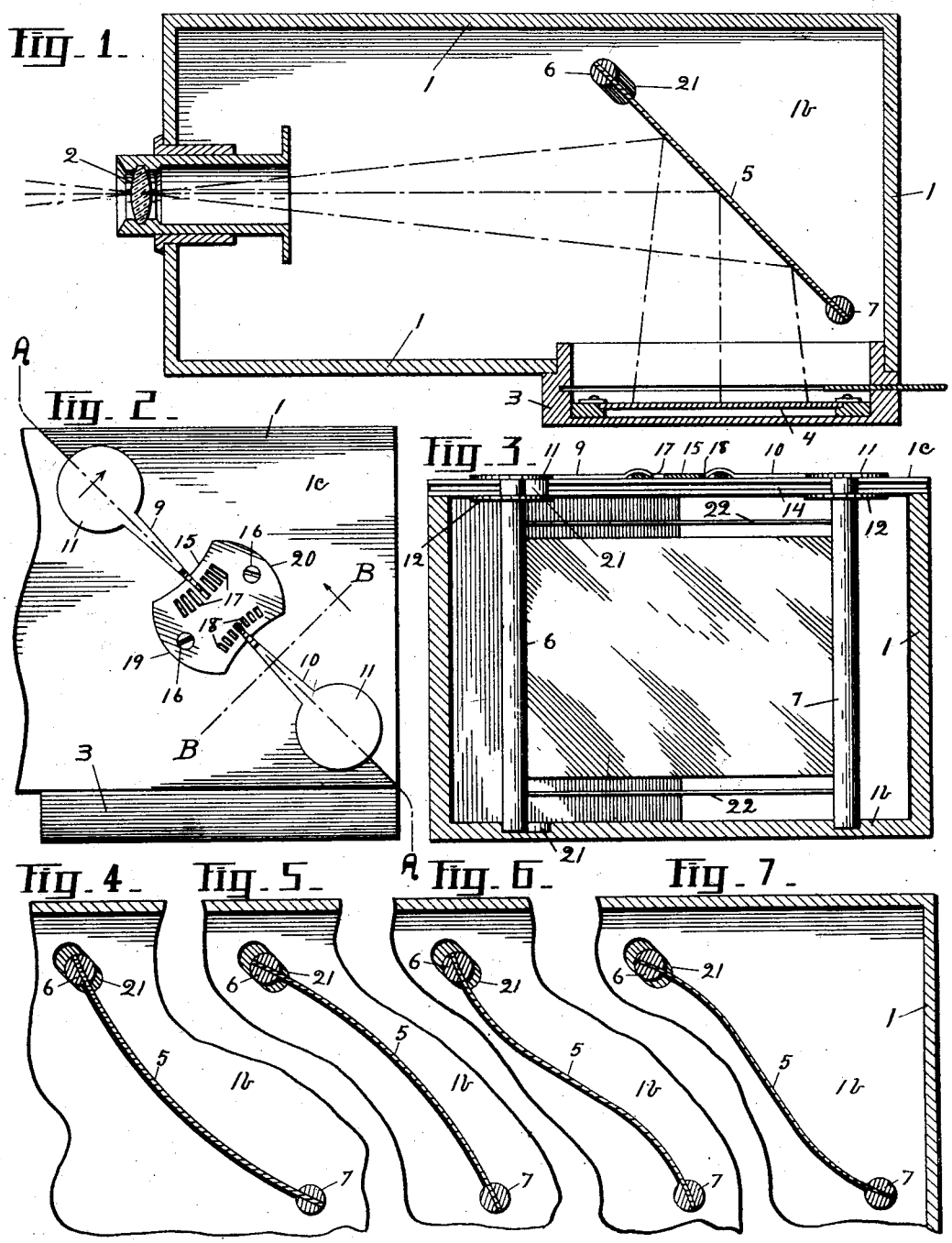
Witnesses
Inventor
George C. Beidler.
By Frank P. Shepard, attorney.

No. 753,351.

Patented March 1, 1904.

UNITED STATES PATENT OFFICE.

GEORGE C. BEIDLER, OF OKLAHOMA, OKLAHOMA TERRITORY.

CAMERA.

SPECIFICATION forming part of Letters Patent No. 753,351, dated March 1, 1904.

Application filed November 17, 1903. Serial No. 181,475. (No model.)

*To all whom it may concern:*

Be it known that I, GEORGE C. BEIDLER, a citizen of the United States, residing at Oklahoma, in the county of Oklahoma and Territory of Oklahoma, have invented certain new and useful Improvements in Cameras, of which the following is a full, clear, and exact description, reference being had to the drawings hereto annexed.

The invention pertains to the class of cameras in which a mirror is used to reflect the rays of light from the lens or light-admitting opening onto the sensitized plate.

The object of the invention is to so improve the camera that pictures differing in proportional measurements from the objects from which they are taken may be produced. Means are also provided for producing pictures in which a part of the object is distorted in one direction, while the other part is distorted in the opposite direction. The mechanism by which these objects are attained is shown by the accompanying drawings, in which—

Figure 1 is a horizontal section of a camera containing the improvements, taken through the camera-lens. Fig. 2 is a top view of the rear part of the camera. Fig. 3 is a vertical section taken on the line A A, Fig. 2. Figs. 4, 5, 6, and 7 are reproductions of the right-hand portion of Fig. 1, showing the mirror in different positions. Fig. 8 is a sectional view of a portion of the camera-roof, taken on the line B B, Fig. 2.

Referring to the several figures, in all of which like characters of reference designate like parts, the numeral 1 represents the camera-box, 2 the lens, 3 the plate-holder, 4 the sensitized plate, and 5 the mirror for reflecting the rays of light from the lens 2 onto said plate. The mirror 5 is made of steel, celluloid, or any suitable flexible material and is supported by two round vertically-disposed shafts 6 and 7, which have kerfs or slots cut diametrically through them, and the ends of the mirror 5 extend through said slots and are held tightly in place by rivets 8, passing through said mirror and shafts. The lower ends of the shafts 6 and 7 are inserted revolubly into the bottom $1^b$ of the camera-box, and the upper ends pass revolubly through the roof $1^c$ and are provided with arms 9 and 10, respectively, for revolving them and locking them in position. The pivotal ends 11 of the arms 9 and 10 are brazed to the upper ends of the shafts 6 and 7, respectively, and are made large enough to project well out over said shafts to prevent light from passing into the camera-box past them, and as an additional safeguard against the passage of light into the camera at these points collars 12 of large diameter are mounted upon the shafts 6 and 7 just below the roof $1^c$ and are secured to said shafts by solder or brazing. In order that the shafts 6 and 7 may be set in place in the camera-box after all of the parts are secured to them, as described, the roof portion $1^c$ is made separable on the line A A, Fig. 2, and one of the separate portions of said roof is provided with a tongue 13, which fits into a corresponding groove 14 on the other portion, as shown in Fig. 8, to make a light-tight joint at the separation-line. A locking-plate 15 lies upon the top of the roof $1^c$ under the free ends of the arms 9 and 10 and is secured in place by two screws 16. This plate 15 is provided with two suitably-curved rows of holes or slots 17 and 18, adapted to receive the free ends of the arms 9 and 10, respectively, the elastic force of the said arms holding their free ends into locking engagement with said holes.

When it is desired to produce an image on the plate 4 wider than would be produced by a plane mirror, the free ends of the arms 9 and 10 are both shifted toward the end 19 of the plate 15, and this operation causes the shafts 6 and 7 to bend the mirror 5 into a convex cylindrical mirror, as is shown in Fig. 4. If a narrow image is desired, the free ends of both arms 9 and 10 are shifted toward the opposite end 20 of the plate 15, thus bending the mirror 5 into a concave cylindrical mirror, as shown in Fig. 6. By shifting the arm 9 toward the end 20 and the other arm 10 toward the end 19 of the plate 15 the mirror 5 will be bent into the form of a reverse curve, as shown in Fig. 6, producing an image having wider proportions on one side and narrower on the other. By reversing the positions of the arms 9 and 10 and bending the mirror 5 into the position shown in Fig. 7 an opposite effect will be produced. It will be seen that by manipulating the arms 9 and 10 and bending the mirror 5 into different shapes images may be produced to different degrees of distortion for amusement or of different proportions for any purpose whatever, and by turning the camera-box over, so that the axis of curvature of the mirror 5 is changed in position, a still greater variety of images may be produced. In bending the mirror 5 or any portion of it into curved position the shafts 6 and 7 must be allowed to move toward each other, and to allow this movement the holes in the roof 1$^c$ and bottom 1$^b$, in which the shaft 6 works, are elongated, as shown at 21, and for the same purpose the holes 17 of the locking-plate 15, in which the end of the arm 9 rests, are elongated. In order that mirrors of very light or flexible material may be used, the shafts 6 and 7 are connected together at points above and below the mirror 5 by small elastic rods 22, made, preferably, of spring-steel, whose ends are extended tightly through said shafts and are secured by solder. When shifting the mirror 5 into the different positions, these rods 22 maintain the proper distance between the shafts 6 and 7 and move said shafts to or from each other the correct and natural amount without depending upon the mirror for this purpose. As a means of indicating the shape or position of the mirror 5 the arms 9 and 10 are so set as to lie in the same straight line and have their points coincide with each other when the mirror stands in the form of a plane. By this arrangement of parts it will be an easy matter for the operator to at all times determine approximately the position of the mirror by the position of the arms 9 and 10 relative to each other.

The foregoing being a full, clear, and exact description of the invention, what I claim, and desire to secure by Letters Patent, is—

1. A camera having a flexible plane mirror mounted within it for reflecting the rays of light from the lens onto the sensitized plate, and means for bending the mirror into curved form, substantially as described.

2. A camera having a flexible plane mirror mounted within it for reflecting the rays of light from the lens onto the sensitized plate, the mirror being supported at each end by a revoluble shaft, and means for revolving said shafts, whereby the mirror may be bent into curved form, substantially as described.

3. A camera having a flexible plane mirror mounted within it for reflecting the rays of light from the lens onto the sensitized plate, the ends of the mirror being secured to revoluble shafts, the ends of the shafts extending through a wall of the camera-box and having arms for revolving them, substantially as described.

4. A camera having a flexible mirror mounted within it for reflecting the rays of light from the lens onto the sensitized plate, the ends of the mirror being secured to revoluble shafts by extending diametrically through said shafts, the shafts extending through a wall of the camera-box and having arms for revolving them, the free ends of said arms projecting over a locking-plate having a series of holes for locking said arms in different positions, substantially as described.

5. A camera having a flexible mirror mounted within it, the ends of the mirror being secured to vertically-disposed revoluble shafts journaled in the top and bottom of the camera-box, the shafts being connected together above and below the mirror by straight elastic rods, means for revolving the shafts, substantially as described.

6. A camera having a flexible mirror mounted within it, the ends of the mirror extending through and being secured to vertically-disposed shafts, the shafts being journaled in the top and bottom of the camera-box, the upper ends of the shafts extending through the camera top and having arms for revolving them, a locking-plate mounted under the free ends of said arms and having holes for said ends to engage, the bearing-openings in which one of the revoluble shafts is journaled being elongated, substantially as described.

7. A camera having a flexible mirror mounted within it, the mirror being supported at its ends by revoluble shafts journaled in the camera-box, the ends of the shafts extending out through the wall of the camera and having arms for revolving them, the arms being so set as to lie in the same straight line when the mirror is in the form of a plane, a locking-plate for the free ends of said arms, substantially as described.

In testimony whereof I have signed this specification, in the presence of two subscribing witnesses, this 7th day of November, 1903.

GEORGE C. BEIDLER.

Witnesses:
J. WESLEY ISLE,
C. R. DAY.